Feb. 13, 1951     L. J. POSPISIL     2,541,970
THREE-LEG TRUCK MOUNTED DERRICK
Filed May 15, 1948     3 Sheets-Sheet 1
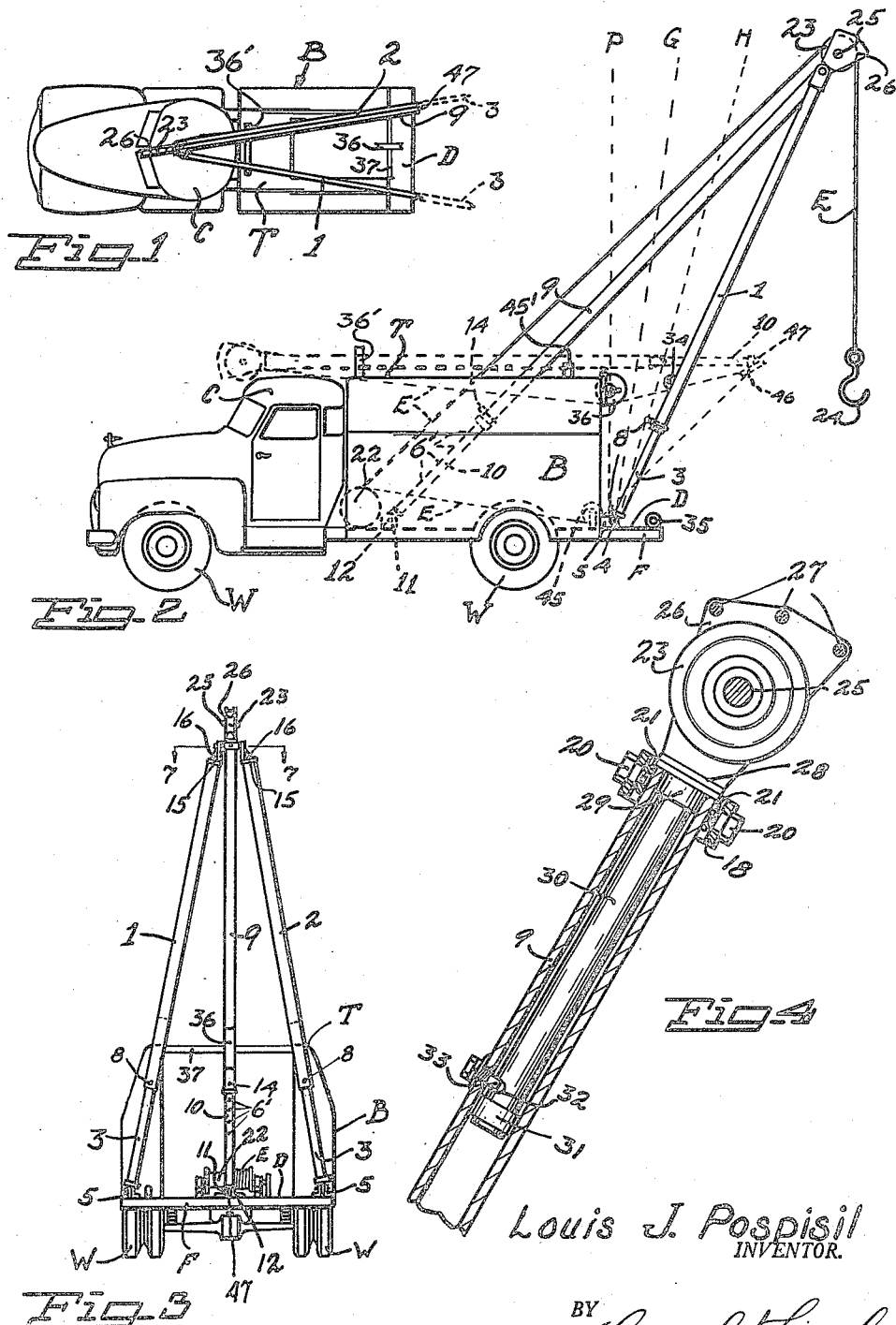
Louis J. Pospisil
INVENTOR.

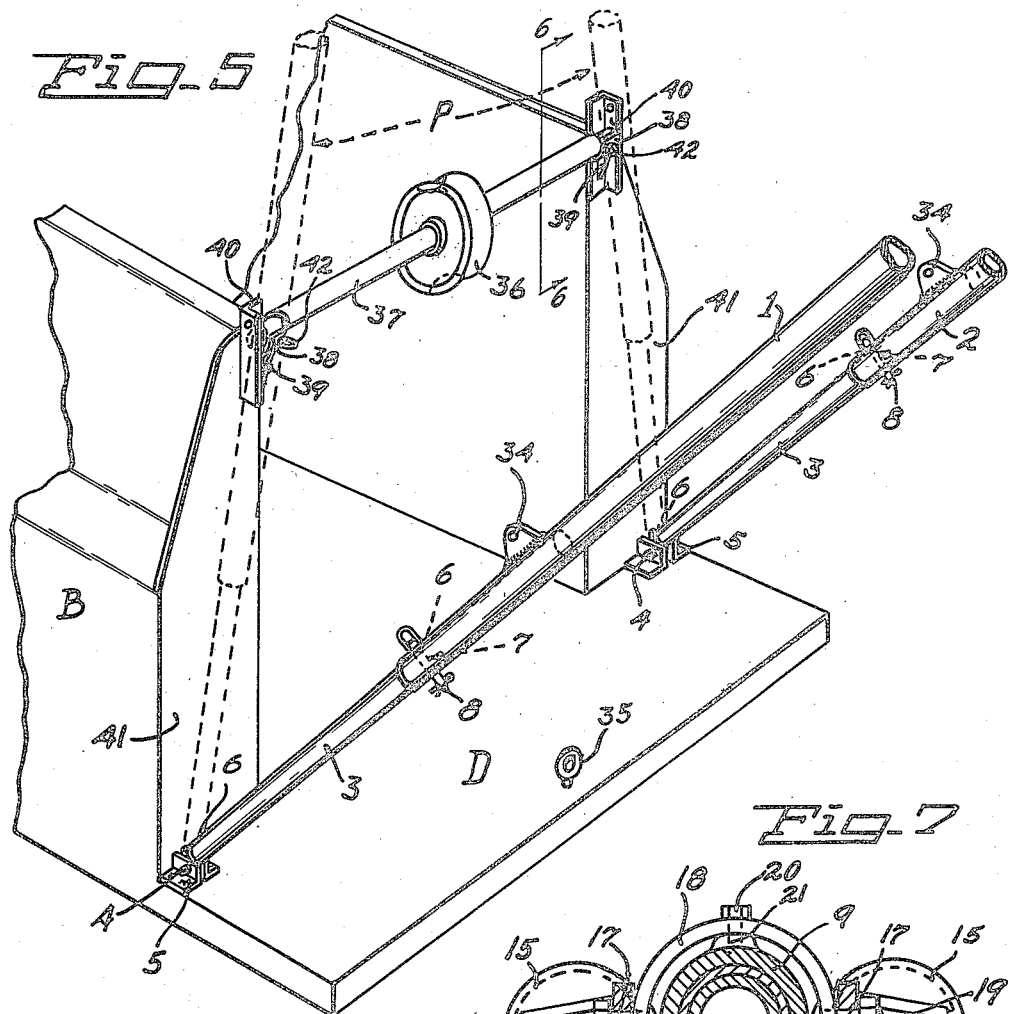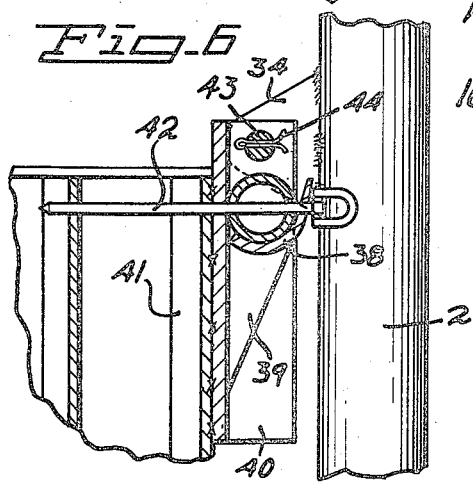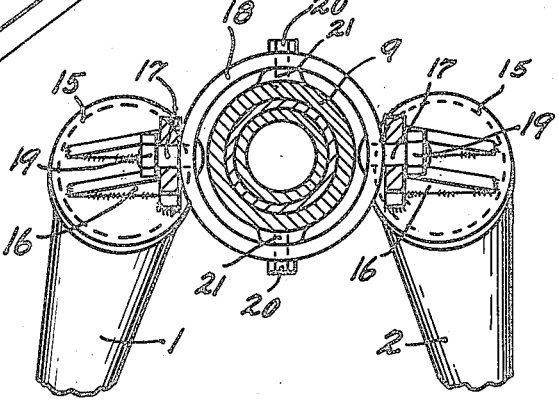

Feb. 13, 1951     L. J. POSPISIL     2,541,970
THREE-LEG TRUCK MOUNTED DERRICK
Filed May 15, 1948     3 Sheets-Sheet 3
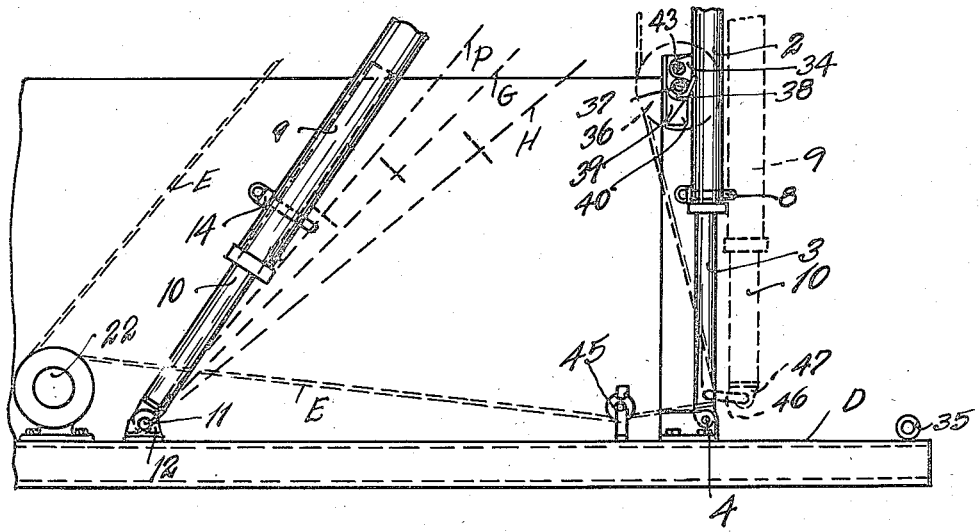
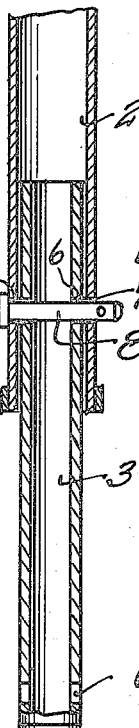
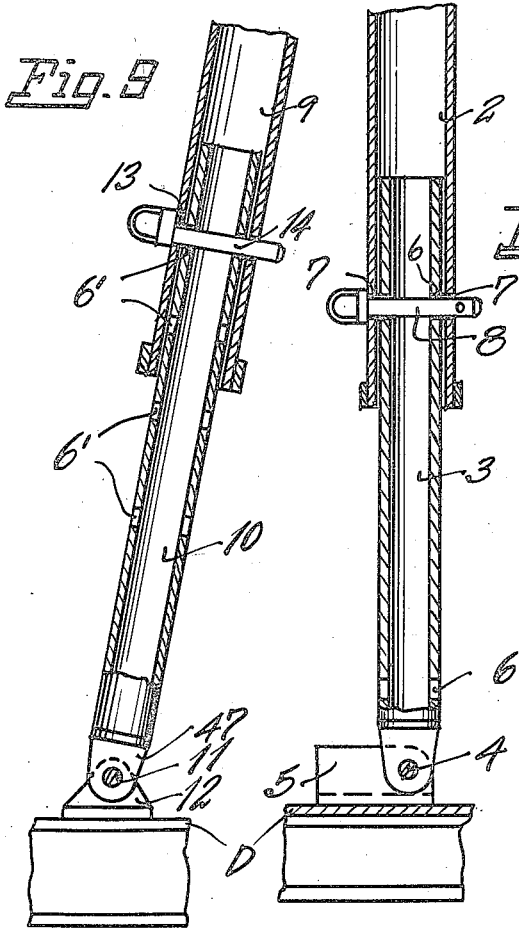
Louis J. Pospisil
INVENTOR.
BY Glenn L. Fish
ATTORNEY Patented Feb. 13, 1951

2,541,970

UNITED STATES PATENT OFFICE 2,541,970

THREE LEG TRUCK MOUNTED DERRICK

Louis J. Pospisil, Spokane, Wash., assignor to Novelty Carriage Works, Inc., Spokane, Wash.

Application May 15, 1948, Serial No. 27,323

5 Claims. (Cl. 212—8)

The present invention relates generally to cable hoist apparatus for handling material and other loads and more specifically to an improved three leg truck mounted derrick which while well adapted for various uses and purposes is especially designed for mounting upon an automotive or motor operated roadway truck. The derrick, crane, or hoisting implement is of the portable and foldable type, with its cable hoist line controlled by means of a winch or drum equipped with clutch and braking mechanism and operated by power take-off mechanism from the power plant of the motor truck. Means are provided for lowering and resting the assembled parts of the derrick in compact arrangement on top of the motor truck or carrier body for transportation purposes without disassembly and with facility the assembled derrick parts may be raised and set up in operative position for use on the vehicle or truck.

In carrying out my invention a minimum number of parts are utilized that may be assembled with convenience upon a motor truck, to provide a derrick adjustable to various heights, which is durable, and which may be operated easily in the performance of its functions.

The invention consists in certain novel features of construction and combinations and arrangements of parts as will hereinafter be described and more particularly set forth in the appended claims.

In the accompanying drawings I have illustrated a complete example of a physical embodiment of my invention in which the parts are combined and arranged in accordance with one mode I have so far devised for the practical application of the principles of my invention. It will however be understood that changes and modifications are contemplated and may be made in these exemplifying drawings and mechanical structures, within the scope of my claims, without departing from the principles of the invention.

Fig. 1 is top plan view showing a motor truck equipped with the derrick of my invention, the derrick being shown in compactly folded and stored position on the truck, for transportation purposes.

Figure 2 is a view in side elevation of the truck or carrier, with the derrick and cable line in hoisting position for loading and unloading operations, and disclosing by dotted lines the parts of the derrick in folded position.

Figure 3 is a view in rear elevation of the derrick shown in Figure 2.

Figure 4 is an enlarged detail vertical sectional view at the upper end of the middle leg or brace member showing the swivel head for the cable pulley or grooved sheave wheel.

Figure 5 is an enlarged detail perspective view at the rear of the truck body disclosing the auxiliary apparatus for use in raising and lowering the derrick parts to operative and inoperative positions.

Figure 6 is an enlarged detail vertical sectional view at line 6—6 of Figure 5; and Figure 7 is an enlarged detail transverse sectional view through the universal joint between the upper ends of the derrick side and middle legs.

Figure 8 is an enlarged sectional view through the truck body showing the lower sections of the legs and their mountings.

Figure 9 is an enlarged sectional view taken through the lower portion of the brace member; and Figure 10 is a view in cross section showing the telescopic arrangement of one of the supporting legs.

In order that the general arrangement and utility of parts may readily be understood I have shown in the assembly views a typical motor truck or roadway vehicle having four wheels W, the usual chassis or frame F with a deck D and body B, and a conventional top T, and cab C for the driver's use.

The three-leg derrick includes longitudinally extensible telescoping, and adjustable sections, of which the pair of upwardly converging legs comprise tubular sections 1 and 2 in the lower ends of which are fitted slidable sections 3, 3 that are pivoted at their lower ends on spaced and aligned bearing pins 4 each mounted in bearing brackets 5 fastened in suitable manner on the deck D of the motor truck.

Each of the side legs is made up of two tubular sections one of which telescopes within the other and permits adjustment and fixation to reduce space requirements during travel.

Thus, the lower section 3 of each side leg is telescopic within the upper section 1 or 2 and after the side legs are lowered on top of the truck body, sections 3 are pushed further into sections 1 and 2 and secured to them by inserting pin 8 through hole or bore 7 of sections 1 or 2 and through complementary hole 6 in tube 3. The derrick includes an inclined middle leg or brace member 9 which serves as a stay for the converging side legs. This middle leg or brace member is formed in two sections, the tubular section 9 is telescopic over and is slidable on a pivot section 10 that is hinged or pivoted on a pin 11 mounted in a bracket 12 that is fastened in a suitable manner on the deck D on the longitudinal axis of the motor truck preferably between the rear wheels and the cab. The two sections of the brace member are adjusted and secured in adjusted position by passing a retaining pin 14 transversely through aligned hole 13 of the tubular section 9 and one of a series of holes 6' in the pivot section 10, thus making it possible to set up the derrick in a number of working positions as P, G, H and the full line position shown in Figure 2.

The upper converging ends of the side legs and the upper end of the brace member are flexibly united by a universal joint to compensate for and permit relative movements at the upper ends of the brace member and side legs as the height of the operating head of the derrick is raised or lowered and also permits, when the derrick is in the lowered position on top of the truck body, the shifting of the brace member from its normal central position to one parallel to one of the side legs, thus allowing unobstructed use of the area in the truck body.

The converging ends of the two legs are each equipped with an end cap 15 rigidly mounted thereon in suitable manner and the caps are provided with brackets 16 for bolts 17 passed through diametrically arranged holes in a universal ring 18 and the brackets, and the bolts are retained by nuts 19. The universal ring surrounds the upper end of the tubular section 9 of the middle leg, and is equipped with a pair of diametrically arranged trunnions 20, 20 and exterior bosses 21 arranged at right angles to the bolts 19, 19. The trunnions 20, 20 as here shown, may be bolts that are passed through holes drilled in the universal ring 18 and threaded into sockets of the bosses, or the four pivotal points of the universal joint may be provided in other suitable manner.

For operating the hoist a cable E is wound upon a winch or drum 22, mounted on the deck of the truck at the rear of the cab C and operated, under manual control, with power take-off mechanism from the power plant of the truck, the usual clutch and brake mechanism being provided for the winch. The cable passes over a sheave or grooved wheel 23, and the end of the cable is equipped with a usual hook 24, for hoisting and lowering a load in customary manner. The wheel 23 is journaled at 25 in a housing 26 and the flanges of the housing are united by spacing bolts 27; the base 28 of the housing forming a swivel head mounted on the end of the middle leg 9 for a limited swiveling movement of the wheel with relation to the middle leg.

For a swivel mount of the sheave or operating wheel, an upper bearing, ring or bushing 29 is mounted on a tubular swivel pin 30 the upper end of which is rigid with the bearing head 28, and the pin projects a suitable distance into the upper end of the tubular section 9 of the middle leg, the lower end of the pin being provided with an exterior centering ring or bushing 31 for bearing contact with the interior surface of the tubular section 9. This swiveled mount for the sheave permits a limited rotary movement on the upright axis of the swivel pin to compensate for any lateral drag by the cable on the sheave, when the hook end of the cable is out of alignment with a plane passing through the center-line of the derrick.

For limiting the swiveling movement of the sheave in its supporting bearings of the middle leg the tubular swivel pin within the brace member is fashioned with an arcuate or segmental slot 32, and a guide and retaining bolt 33 is threaded through a tapped hole in the tubular section 9 for projection into the slot of the swivel pin.

When not in use the lowered derrick parts may compactly be stowed or stored upon the truck body and the stored parts may be secured against displacement during transportation, by means of auxiliary devices, and as indicated in Fig. 1 and also shown by dotted lines in Fig. 2.

This auxiliary equipment includes quick detachable and readily removable parts employed in combination with the operating cable by means of which the parts may be handled with a minimum expenditure of time and manual labor, and for joint use with the auxiliary equipment the tubular leg-sections 1 and 2 are each provided with a rigidly mounted perforated ear as 34 rigidly mounted as by welding on the sections.

Also for auxiliary use the deck D of the truck is equipped with an eyebolt 35 located at the center of the deck or frame; and a top portion of the body B is equipped with a centrally located and notched bracket or saddle 36' rigidly fastened in suitable manner, to prevent lateral as well as upward movement of the stored parts that rest upon the top of the body of the truck.

For varying the working positions of the derrick as shown by dotted lines in Fig. 2, the brace member may be adjusted to increase or decrease its over-all length and the side legs may be swung on their pivotal supports 4 from the extreme outward working position shown to the selected inward working positions shown by the intermediate dotted lines G and H, or to the final position P where the legs of the derrick will stand perpendicular to the deck of the truck.

To assist in erecting the derrick to upright working position, and as an aid in lowering the derrick parts for compactly storing them on top of the truck body the auxiliary equipment of the truck includes a readily dismountable pulley wheel 36 that is adapted for coaction with the cable E, and mounted transversely of the truck in an elevated position at the rear end of the body. The pulley wheel is journaled at the approximate center of a horizontally disposed tubular axle 37, which at its opposite ends is detachably mounted in a pair of U-shaped holders or saddles 38 having vertically arranged braces 39 and affixed as by welding to a pair of upright angle plates or brackets 40 each of which is welded or otherwise secured to end plate 41 of the body B of the truck.

The tubular axle is retained against accidental displacement by means of a pair of comparatively long cotter pins or bolts 42 that are passed through registering holes drilled in the axle and the axle holders, as well as through apertures in the body plates of the truck.

As best seen in Fig. 6 the angular brackets 40, near their upper ends are drilled to form holes for co-action with the perforated ears 34 of the tubular leg sections, and retaining bolts 43 are passed through the ears and brackets and secured by cotter pins 44. The bolts 43 may be employed for holding the derrick legs in perpendicular position, as indicated in Fig. 6, and they also are used as pivots in swinging the tubular sections of the two legs down to horizontal position for storage on top of the truck body, and for swinging the tubular sections from storage position to upright position for assembly and use.

As indicated by dotted lines in Fig. 2 a snatch-block 45 is mounted on the deck D, and cable E is passed under the snatch-block and through an auxiliary clevis 46 that is mounted on the pivot ear 47 rigid with the pivotal end of section 10 of the extensible brace member.

To lower the derrick from working position in Fig. 2 and store the derrick parts as indicated in Fig. 1 and in dotted outline in Fig. 2 the hook at end of cable E is secured in the eye-bolt 35, pin 14 is removed to release the telescopic sections of the brace member, and the cable is wound on the winch, thus raising the derrick to an upright position where the two side legs are then secured and supported by pins 43.

The axle 37 and its auxiliary pulley 36 are then removed and the retracted brace member is swung on its trunnions 17 far enough to the rear to give room for reinsertion of the axle and pulley into their usual positions. Cable E is now pulled under the snatch-block 45 and through clevis 46, and thence passed under auxiliary pulley 36 to the derrick sheave 23. The pivot pins 4 of the pivot sections 3 are removed. The derrick is then lowered by releasing the cable from the winch, the tubular sections 1 and 2 then swing on their pivot pins 43 to a front horizontal position, and the brace member swings upon the pulley 36 as a pivot or bulcrum until the converging ends of the side legs are fitted into the saddle 36' on the top of the truck body. To provide clearance at the center of the truck body the brace member is swung laterally into parallelism with one of the derrick side legs and rested on and secured to an auxiliary saddle 45' provided on top of the truck body. The converging ends are fastened within the notched bracket or saddle 36' to prevent displacement.

The pins 8 are now removed and the pivot sections are slipped up into their complementary tubular sections and fastened by pins 8 through holes 6 located at the bottom of the pivot sections.

For raising the derrick to its working position the steps described are gone through in reversed sequence.

Having thus fully described my invention, what I claim as new and desire to secure by Letters Patent is:

1. In a derrick, the combination with three converging legs each having a lower pivotal support, a universal joint uniting the converging upper ends of the legs, and the central leg having a tubular bearing, of a swivel pin journaled in the tubular bearing, a head on the pin bearing on the central leg, and a sheave wheel journaled in said head.

2. In a derrick, the combination with three converging legs each having a lower pivotal support, a universal joint uniting the converging upper ends of the legs, and the central leg having a tubular bearing, of a tubular swivel pin journaled in the tubular bearing and an arcuate slot in said pin, a stop bolt mounted in the tubular bearing and engaged in said slot, a bearing head on the pin seated on the tubular bearing, and a sheave journaled in said head.

3. In a derrick, the combination with a pair of laterally spaced and upwardly converging legs each having a pivotal support, and a brace member having a pivoted lower end with its upper end centered between the legs, of an annular ring having exterior aligned trunnions journaled on the legs, a second pair of right angle trunnions mounted on the ring and journaled on the brace member, a swivel mount journaled in the upper end of the brace member, a bearing head on the mount above the ring, and a sheave journaled in the bearing head.

4. In a derrick for use on an automotive truck having laterally spaced fixed perforated brackets, the combination with a pair of laterally spaced legs having pivotal supports on the truck, a perforated ear rigid with each leg, and retaining bolts co-acting with said brackets and ears for supporting the legs in upright position, of a brace member pivotally mounted on the truck, a universal joint pivotally uniting the converging upper ends of the legs and the brace member, and a sheave having a swivel mount on the upper end of the brace member.

5. In a foldable cable-operated hoisting derrick including three upwardly converging legs each having a detachable pivotal support on an automotive truck, and a universal joint uniting the converging ends of the legs, the combination with laterally spaced auxiliary perforated brackets fixed on the truck, an auxiliary axle detachably mounted on the truck, and a pulley journaled on the axle adapted as a pivotal support for one of the folding legs, of a pair of perforated ears on two of the legs, pins rotatably uniting the ears with said brackets, and said pins adapted to form pivotal bearings for the two folding legs.

LOUIS J. POSPISIL.

REFERENCES CITED

The following references are of record in the file of this patent:

UNITED STATES PATENTS

| Number | Name | Date |
|---|---|---|
| 1,096,337 | Wieland | May 12, 1914 |
| 1,359,378 | Holmes | Nov. 16, 1920 |
| 1,641,351 | Nilson | Sept. 6, 1927 |
| 1,658,873 | Younkman et al. | Feb. 14, 1928 |
| 1,873,433 | Larsen | Aug. 23, 1932 |
| 2,257,873 | Troche | Oct. 7, 1941 |
| 2,290,384 | Rowe | July 21, 1942 |
| 2,491,357 | Ashton | Dec. 13, 1949 |